US012787133B2

(12) United States Patent
Wang et al.

(10) Patent No.: US 12,787,133 B2
(45) Date of Patent: Nov. 3, 2026

(54) METHOD AND APPARATUS FOR CONTROLLING ELECTROMAGNETIC HEATING DEVICE, AND ELECTROMAGNETIC HEATING DEVICE

(71) Applicant: SHENZHEN SMOORE TECHNOLOGY LIMITED, Shenzhen (CN)

(72) Inventors: Longjiang Wang, Shenzhen (CN); Feng Xiao, Shenzhen (CN); Meifan Xuan, Shenzhen (CN); Shuwen Li, Shenzhen (CN); Ming Yang, Shenzhen (CN); Qiang Xu, Shenzhen (CN)

(73) Assignee: SHENZHEN SMOORE TECHNOLOGY LIMITED, Shenzhen (CN)

( * ) Notice: Subject to any disclaimer, the term of this patent is extended or adjusted under 35 U.S.C. 154(b) by 667 days.

(21) Appl. No.: 18/308,251

(22) Filed: Apr. 27, 2023

(65) Prior Publication Data

US 2023/0354486 A1 Nov. 2, 2023

(30) Foreign Application Priority Data

Apr. 29, 2022 (CN) ......................... 202210464190.7

(51) Int. Cl.
*H05B 6/66* (2006.01)

(52) U.S. Cl.
CPC .................................... *H05B 6/664* (2013.01)

(58) Field of Classification Search
CPC .................................. H05B 6/664; H05B 6/06
See application file for complete search history.

(56) References Cited

U.S. PATENT DOCUMENTS

2008/0138099 A1* 6/2008 Yashiro .............. G03G 15/5004
399/37
2018/0245794 A1* 8/2018 Mao .......................... F24C 7/06

FOREIGN PATENT DOCUMENTS

| | | | | | |
|---|---|---|---|---|---|
| CA | 3096799 | C | * | 1/2024 | ............... H05B 6/06 |
| CN | 104214804 | A | * | 12/2014 | |
| CN | 106678899 | A | * | 5/2017 | .............. F24C 7/081 |
| CN | 106979541 | A | * | 7/2017 | ............... H05B 6/06 |
| CN | 207964112 | U | | 10/2018 | |
| CN | 109429399 | A | * | 3/2019 | ............... H05B 6/06 |

(Continued)

OTHER PUBLICATIONS

Jiang et al. CN112714515A_MT (Year: 2021).*
(Continued)

*Primary Examiner* — Nathaniel E Wiehe
*Assistant Examiner* — Wayne A Lambert
(74) *Attorney, Agent, or Firm* — Leydig, Voit & Mayer, Ltd.

(57) ABSTRACT

A method for controlling an electromagnetic heating device includes: obtaining a sampling current obtained by a current sampling apparatus detecting a main loop in which an electromagnetic oscillation and power output circuit of an electromagnetic heating device is located; detecting, according to the sampling current and preset determining data, whether the electromagnetic heating device accommodates a medium; and controlling, if the electromagnetic heating device does not accommodate a medium, the electromagnetic oscillation and power output circuit to stop electromagnetic oscillation.

13 Claims, 4 Drawing Sheets

(56) References Cited

FOREIGN PATENT DOCUMENTS

| | | | | | |
|---|---|---|---|---|---|
| CN | 105960041 B | * | 5/2019 | ............... | H05B 6/06 |
| CN | 111010755 A | | 4/2020 | | |
| CN | 112333864 A | | 2/2021 | | |
| CN | 112714515 A | | 4/2021 | | |
| CN | 112839398 A | * | 5/2021 | ............... | H05B 3/08 |
| CN | 113339854 A | | 9/2021 | | |
| CN | 115697103 B | * | 7/2024 | ............... | H05B 6/10 |
| JP | H088048 A | * | 1/1996 | | |
| WO | WO-2010140283 A1 | * | 12/2010 | ............. | H05B 6/062 |
| WO | WO-2014068648 A1 | * | 5/2014 | ............. | H05B 6/062 |

OTHER PUBLICATIONS

Liu et al. CN109429399A Espacenet—English Machine Translation (Year: 2019).*
Zeng et al. CN113339854_MT (Year: 2021).*
Zhong et al. Espacenet—English Machine Translation (Year: 2017).*
Zhu et al. CN111010755_MT (Year: 2020).*
Canadian Intellectual Property Office, Office Action in Canadian Patent Application No. 3, 189, 140 (Jun. 14, 2024).
Canadian Intellectual Property Office, Office Action in Canadian Patent Application No. 3, 189, 140 (May 27, 2025).
Chinese Patent Office, Office Action in Chinese Patent Application No. 202210464190.7 (Mar. 21, 2026).

* cited by examiner

METHOD AND APPARATUS FOR CONTROLLING ELECTROMAGNETIC HEATING DEVICE, AND ELECTROMAGNETIC HEATING DEVICE

CROSS-REFERENCE TO PRIOR APPLICATION

Priority is claimed to Chinese Patent Application No. 202210464190.7, filed on Apr. 29, 2022, the entire disclosure of which is hereby incorporated by reference herein.

FIELD

This application relates to the field of heating device technologies, and in particular, to a method and apparatus for controlling an electromagnetic heating device, and an electromagnetic heating device.

BACKGROUND

With the development of science and technologies and the continuous progress of society, more and more electrical devices appear in people's daily work and life. An electromagnetic heating device can realize heating without a direct contact with a heated medium by using a principle of electromagnetic induction heating. However, the existing electromagnetic heating device continuously heats after startup, which is easy to cause a problem such as a large power loss or a hardware failure, so as to have a disadvantage of low usage convenience.

SUMMARY

In an embodiment, the present invention provides a method for controlling an electromagnetic heating device, comprising: obtaining a sampling current obtained by a current sampling apparatus detecting a main loop in which an electromagnetic oscillation and power output circuit of an electromagnetic heating device is located; detecting, according to the sampling current and preset determining data, whether the electromagnetic heating device accommodates a medium; and controlling, if the electromagnetic heating device does not accommodate a medium, the electromagnetic oscillation and power output circuit to stop electromagnetic oscillation.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
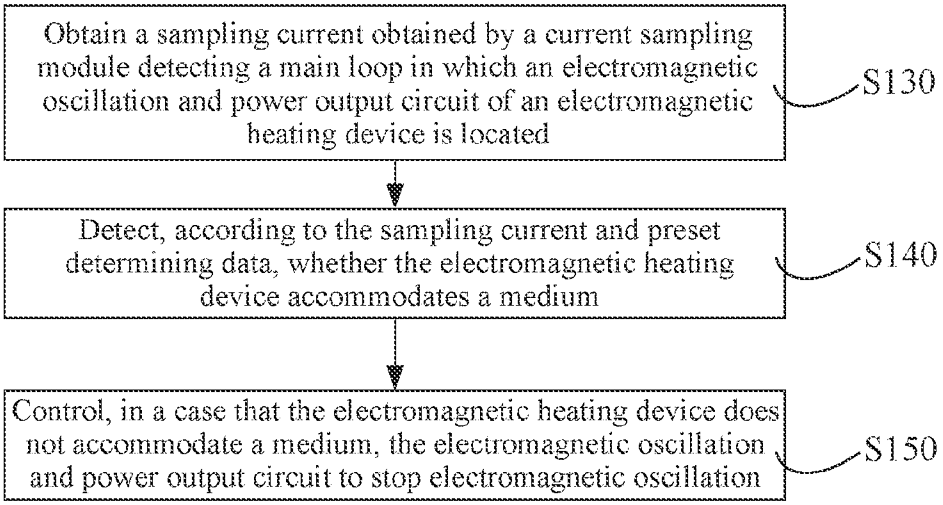
FIG. 1 is a flowchart of a method for controlling an electromagnetic heating device according to an embodiment.

In an embodiment, the present invention provides a method and apparatus for controlling an electromagnetic heating device, and an electromagnetic heating device that can improve the usage convenience.

A method for controlling an electromagnetic heating device is provided, including:

- obtaining a sampling current obtained by a current sampling apparatus detecting a main loop in which an electromagnetic oscillation and power output circuit of an electromagnetic heating device is located;
- detecting, according to the sampling current and preset determining data, whether the electromagnetic heating device accommodates a medium; and
- controlling, in a case that the electromagnetic heating device does not accommodate a medium, the electromagnetic oscillation and power output circuit to stop electromagnetic oscillation.

In an embodiment, the determining data includes a determining threshold, and before the detecting, according to the sampling current and preset determining data, whether the electromagnetic heating device accommodates a medium, the method further includes:

- determining the determining threshold according to a type of material used for heating a medium.

In an embodiment, the determining the determining threshold according to a type of material used for heating a medium includes:

- setting, in a case that the material used for heating the medium is a first-type material, the determining threshold to be a direct current less than a current of the electromagnetic heating device in a no-load state, where in a case that the electromagnetic heating device accommodates a medium heated using the first-type material, a direct current of the main loop is less than the direct current in the no-load state of the electromagnetic heating device.

In an embodiment, the detecting, according to the sampling current and preset determining data, whether the electromagnetic heating device accommodates a medium includes that:

- if the sampling current is less than the determining threshold, the electromagnetic heating device accommodates a medium.

In an embodiment, the determining the determining threshold according to a type of material used for heating a medium further includes:

- setting, in a case that the material used for heating the medium is a second-type material, the determining threshold to be greater than a direct current of the electromagnetic heating device in a no-load state, where in a case that the electromagnetic heating device accommodates a medium heated using the second-type material, a direct current of the main loop is greater than the direct current in the no-load state of the electromagnetic heating device.

In an embodiment, the detecting, according to the sampling current and preset determining data, whether the electromagnetic heating device accommodates a medium further includes that:

if the sampling current is greater than the determining threshold, the electromagnetic heating device accommodates a medium.

In an embodiment, before the obtaining a sampling current obtained by a current sampling apparatus detecting a main loop in which an electromagnetic oscillation and power output circuit of an electromagnetic heating device is located, the method further includes:

controlling, after a key wakeup instruction is received or electromagnetic oscillation is turned off for a set duration, the electromagnetic oscillation and power output circuit to start the electromagnetic oscillation.

In an embodiment, after the controlling, in a case that the electromagnetic heating device does not accommodate a medium, the electromagnetic oscillation and power output circuit to stop electromagnetic oscillation, the method further includes: returning, after delaying for a preset duration, to the step of controlling the electromagnetic oscillation and power output circuit to start electromagnetic oscillation, until a quantity of times of turning off the electromagnetic oscillation reaches a preset quantity of times.

An apparatus for controlling an electromagnetic heating device is provided, including:

a data obtaining module, configured to obtain a sampling current obtained by a current sampling apparatus detecting a main loop in which an electromagnetic oscillation and power output circuit of an electromagnetic heating device is located;

a medium detection module, configured to detect, according to the sampling current and preset determining data, whether the electromagnetic heating device accommodates a medium; and a heating control module, configured to control, in a case that the electromagnetic heating device does not accommodate a medium, the electromagnetic oscillation and power output circuit to stop electromagnetic oscillation.

An electromagnetic heating device is provided, including a control apparatus, a current sampling apparatus, and an electromagnetic oscillation and power output circuit, where the current sampling apparatus is connected to a main loop in which the electromagnetic oscillation and power output circuit is located, the control apparatus is connected to the current sampling apparatus and the electromagnetic oscillation and power output circuit, the current sampling apparatus is configured to detect the main loop in which the electromagnetic oscillation and power output circuit is located to obtain a sampling current, and send the sampling current to the control apparatus, and the control apparatus is configured to perform electromagnetic heating control according to the above method.

In the above method and apparatus for controlling an electromagnetic heating device, and electromagnetic heating device, after a current sampling apparatus detects a main loop in which an electromagnetic oscillation and power output circuit of an electromagnetic heating device is located to obtain a sampling current, it is detected whether the electromagnetic heating device accommodates a medium with reference to the sampling current and preset determining data, and the electromagnetic oscillation and power output circuit is controlled to stop electromagnetic oscillation in a case that the electromagnetic heating device does not accommodate a medium. In this way, waste of electric energy or a device failure caused by the electromagnetic heating device working in a state without accommodating a medium is avoided, thereby improving the service life of the device, reducing the loss of electric energy, and improving the usage convenience of the electromagnetic heating device.

To make the objectives, technical solutions, and advantages of this application clearer and more understandable, this application is further described in detail below with reference to the accompanying drawings and the embodiments. It is to be understood that the specific embodiments described herein are only used for explaining this application, and are not used for limiting this application.

In an embodiment, a method for controlling an electromagnetic heating device is provided, where the electromagnetic heating device may be a device using electromagnetic heating such as an electronic vaporization apparatus or a heating appliance. For ease of understanding, an example in which the electromagnetic heating device is the electronic vaporization apparatus and the medium used in the electronic vaporization apparatus is a vaporization medium is used below for description. As shown in FIG. 1, the method includes the following steps.

Step S130. Obtaining a sampling current obtained by a current sampling apparatus detecting a main loop in which an electromagnetic oscillation and power output circuit of an electromagnetic heating device is located.

Specifically, a main loop in which an electromagnetic oscillation and power output circuit of the electronic vaporization apparatus is located is connected to an external direct current power supply, and a control apparatus is connected to the electromagnetic oscillation and power output circuit to control working of the electromagnetic oscillation and power output circuit. The electromagnetic oscillation and power output circuit includes an oscillation circuit and a switch control circuit. After a vaporization medium equipped with a metal heating device is placed in an electromagnetic coil of the oscillation circuit, high-frequency oscillation generated by the circuit is induced to a metal sheet through the electromagnetic coil to realize electromagnetic heating, so as to realize power output. A current signal is directly obtained by the current sampling apparatus from the main loop, and is amplified and outputted to the control apparatus, so as to be used as a basis for the control apparatus to perform medium detection. The control apparatus may be a separate controller, and may also use an original controller of the electronic vaporization apparatus. The control apparatus may include a controller and a drive circuit. The controller is connected to the current sampling apparatus and the drive circuit. The drive circuit is connected to the electromagnetic oscillation and power output circuit. A type of the controller is also not unique, and may specifically use a micro controller unit (MCU), a field programmable gate array (FPGA), or the like.

Step S140. Detecting, according to the sampling current and preset determining data, whether the electromagnetic heating device accommodates a medium.

After the sampling current sent by the current sampling apparatus is received, the control apparatus analyzes with reference to the pre-stored determining data, to determine whether a vaporization medium is accommodated in the electronic vaporization apparatus. The determining data may include a current threshold or current curve data. Correspondingly, the control apparatus may compare the sampling current with the current threshold, to determine whether the electronic vaporization apparatus accommodates a vaporization medium. The control apparatus may also generate a current heating curve according to sampling currents received within a set period of time, and compare the current heating curve with the current curve data. If an error between the current heating curve and the current curve data is less than an allowable error threshold, it is considered that the current heating curve matches the current curve data, and it is determined that the electronic vaporization apparatus accommodates a vaporization medium; otherwise, it is considered that the current heating curve does not match the current curve data, and the electronic vaporization apparatus does not accommodate a vaporization medium. In addition, in other embodiments, the control apparatus may also analyze with reference to the current threshold and the current curve data. When a detected actual current meets conditions corresponding to the current threshold and the current curve data, it is determined that the electronic vaporization apparatus accommodates a vaporization medium. If one of the conditions is not met, it is determined that the electronic vaporization apparatus does not accommodate a vaporization medium.

Step S150. Controlling, in a case that the electromagnetic heating device does not accommodate a medium, the electromagnetic oscillation and power output circuit to stop electromagnetic oscillation. Correspondingly, the control apparatus controls, in a state of determining that the electronic vaporization apparatus does not accommodate a vaporization medium, the electromagnetic oscillation and power output circuit to stop power output, so as to stop electromagnetic oscillation. If the electronic vaporization apparatus accommodates a vaporization medium, the control apparatus controls the electronic vaporization apparatus to continue working.

In the above method for controlling an electromagnetic heating device, after a current sampling apparatus detects a main loop in which an electromagnetic oscillation and power output circuit of an electromagnetic heating device is located to obtain a sampling current, it is detected whether the electromagnetic heating device accommodates a medium with reference to the sampling current and preset determining data, and the electromagnetic oscillation and power output circuit is controlled to stop electromagnetic oscillation in a case that the electromagnetic heating device does not accommodate a medium. In this way, waste of electric energy or a device failure caused by the electromagnetic heating device working in a state without accommodating a medium is avoided, thereby improving the service life of the device, reducing the loss of electric energy, and improving the usage convenience of the electromagnetic heating device.

Figure 2:
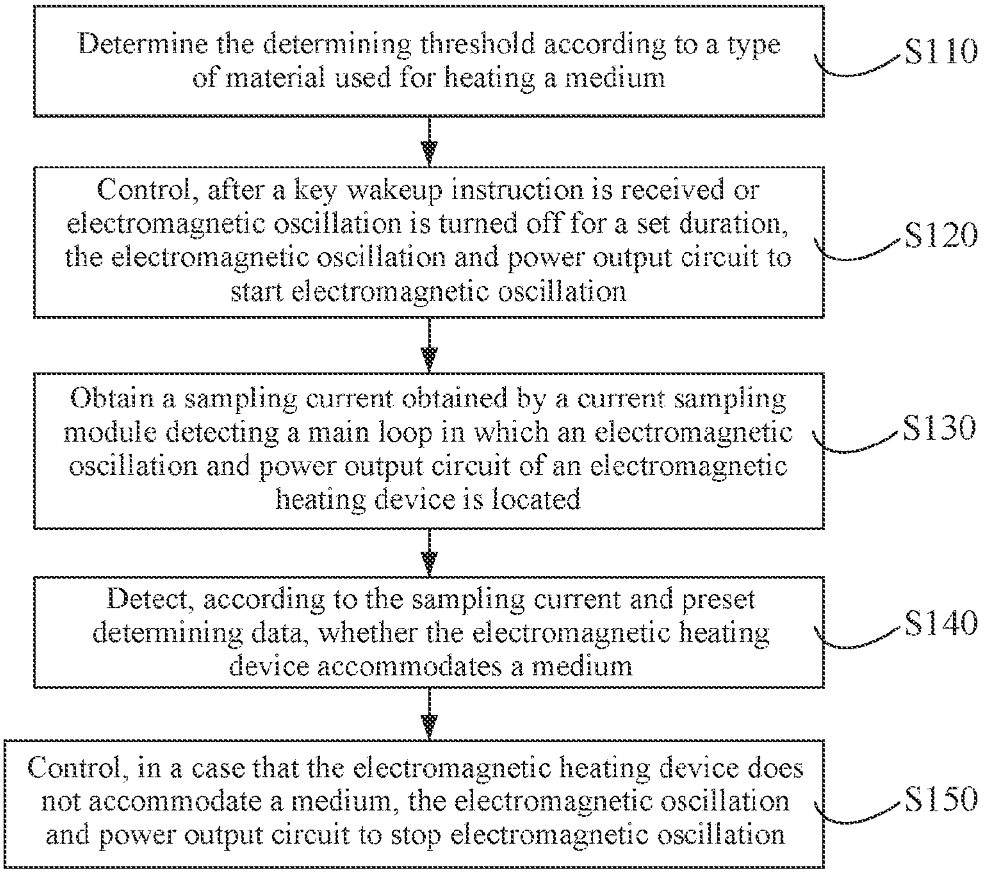
FIG. 2 is a flowchart of a method for controlling an electromagnetic heating device according to another embodiment.

In an embodiment, the determining data includes a determining threshold. As shown in FIG. 2, before step S140, the method further includes step S110: determining the determining threshold according to a type of material used for heating a medium.

Step S110 may be performed before or after or when step S130 is performed. The type of material used for heating the medium refers to a type of material selected by a device configured to heat the medium. Specifically, according to different metal materials selected by a device configured to heat a vaporization medium, when the electronic vaporization apparatus heats the vaporization medium, current changes in the main loop are also different. For example, when a device including an alloy or a metal made of a class 1 material is used to heat the vaporization medium, a current in the main loop is less than a current of the electronic vaporization apparatus in a no-load state (namely, a state without a vaporization medium); and when a device including an alloy or a metal made of a material of class 2 is used to heat the vaporization medium, a current in the main loop is greater than the current of the electronic vaporization apparatus in the no-load state. When the electronic vaporization apparatus may support devices using different types of materials to heat the vaporization medium, the control apparatus may pre-store determining thresholds corresponding to the devices using different types of materials. After accommodating the vaporization medium in the electronic vaporization apparatus, a user may input, according to a type of material included in an actually used device for heating the vaporization medium, an instruction through a key and other interaction apparatuses of the electronic vaporization apparatus, and the control apparatus determines the type of material used by the device for heating the vaporization medium according to the received instruction, to determine a determining threshold for detecting the vaporization medium, so that the detection accuracy can be improved.

In an embodiment, step S110 includes: setting, in a case that the material used for heating the medium is a first-type material, the determining threshold to be less than a direct current in a no-load state of the electromagnetic heating device, where in a case that the electromagnetic heating device accommodates a medium heated using the first-type material, a direct current of the main loop is less than the direct current in the no-load state of the electromagnetic heating device. Specifically, when determining that the electronic vaporization apparatus uses a device including the first-type material to heat the vaporization medium, the control apparatus sets the determining threshold to be less than the direct current in the no-load state, for example, selects 80% of the direct current in the no-load state as the determining threshold.

Correspondingly, in an embodiment, step S140 includes that: if the sampling current is less than the determining threshold, the electromagnetic heating device accommodates a medium. After the control apparatus sets the determining threshold to be less than the direct current of the electromagnetic heating device in the no-load state, through analog-to-digital sampling of the direct current and threshold determining, if a detected current value is less than the determining threshold, it is determined that there is a vaporization medium; otherwise, there is no vaporization medium. In addition, in other embodiments, to avoid mixing of other types of materials, the control apparatus may also analyze, when the detected current value is less than the determining threshold, a current heating curve within a specific duration (for example, 10 s to 30 s) during a heating process; determine that there is a vaporization medium if the current heating curve meets set curve data; and determine that there is no vaporization medium if the current heating curve does not meet set curve data.

In an embodiment, step S110 further includes: setting, in a case that the material used for heating the medium is a second-type material, the determining threshold to be greater than a direct current in a no-load state of the electromagnetic heating device, where in a case that the electromagnetic heating device accommodates a medium heated using the second-type material, a direct current of the main loop is greater than the direct current in the no-load state of the electromagnetic heating device. When determining that the electronic vaporization apparatus uses a device including the second-type material to heat the vaporization medium, the control apparatus sets the determining threshold to be greater than the direct current in the no-load state, for example, selects 120% of the direct current in the no-load state as the determining threshold.

Correspondingly, in an embodiment, step S140 further includes that: if the sampling current is greater than the determining threshold, the electromagnetic heating device accommodates a medium. After the control apparatus sets the determining threshold to be greater than the direct current of the electromagnetic heating device in the no-load state, through analog-to-digital sampling of the direct current and threshold determining, if a detected current value is greater than the determining threshold, it is determined that there is a vaporization medium; otherwise, there is no vaporization medium. In addition, to ensure safe and stable running of the circuit, when determining that a current is greater than a preset overcurrent threshold, the control apparatus also provides overcurrent protection for the electronic vaporization apparatus. The preset overcurrent threshold is greater than the determining threshold, and a specific value thereof may be set according to actual situations.

In an embodiment, still referring to FIG. 2, before step S130, the method further includes step S120: controlling, after a key wakeup instruction is received or electromagnetic oscillation is turned off for a set duration, the electromagnetic oscillation and power output circuit to start the electromagnetic oscillation.

Specifically, when the electronic vaporization apparatus is a device with a key, the user may control start and stop of the electronic vaporization apparatus through the key. The control apparatus controls, after the key wakeup instruction is received, the electromagnetic oscillation and power output circuit to start electromagnetic oscillation, and the electronic vaporization apparatus starts to work. When the control apparatus determines that there is a vaporization medium according to the sampling current, the electronic vaporization apparatus continues working; and if there is no vaporization medium, the control apparatus controls the electromagnetic oscillation and power output circuit to turn off the electromagnetic oscillation.

When the electronic vaporization apparatus is a device without a key, the control apparatus may automatically and cyclically control start and stop of the electronic vaporization apparatus. After the electronic vaporization apparatus turns off electromagnetic oscillation for the set duration, the control apparatus automatically starts the electromagnetic oscillation, and the electronic vaporization apparatus starts to work. When the control apparatus determines that there is a vaporization medium according to the sampling current, the electronic vaporization apparatus continues working; and if there is no vaporization medium, the control apparatus controls the electromagnetic oscillation and power output circuit to turn off the electromagnetic oscillation.

Further, in an embodiment, after step S150, the method further includes: returning, after delaying for a preset duration, to the step of controlling the electromagnetic oscillation and power output circuit to start electromagnetic oscillation, until a quantity of times of turning off the electromagnetic oscillation reaches a preset quantity of times.

Specifically, after the electromagnetic oscillation and power output circuit is controlled to stop the electromagnetic oscillation in a case that it is detected that the electronic vaporization apparatus does not accommodate a vaporization medium, the control apparatus first analyzes whether the quantity of times of turning off the electromagnetic oscillation reaches the preset quantity of times, and waits for next time of key start or next time of automatic start if the quantity of times of turning off the electromagnetic oscillation has reached the preset quantity of times.

The control apparatus performs timing if the quantity of times of turning off the electromagnetic oscillation does not reach the preset quantity of times; starts the electromagnetic oscillation again and performs current detection again after the timing reaches a preset duration; normally works if determining that there is a vaporization medium according to the current detection; and turns off the electromagnetic oscillation if determining that there is no vaporization medium according to the current detection.

To facilitate a better understanding of the above method for controlling an electromagnetic heating device, the electronic vaporization apparatus is used as an example for detailed description below.

Existing electromagnetic electronic vaporization apparatuses have different degrees of misjudgment for a vaporization medium, which is easy to cause a problem such as a large power loss or a hardware failure, thus causing poor user experience for users. This application provides a solution for detecting a vaporization medium at a fixed frequency by using an electromagnetic electronic vaporization apparatus. A detection circuit and a control manner are simple, the costs are low, the control precision is high, and the consistency is good. Power output can be stopped when it is determined that there is no vaporization medium, thereby saving energy, reducing consumption, and improving the service life of a device.

Figure 3:
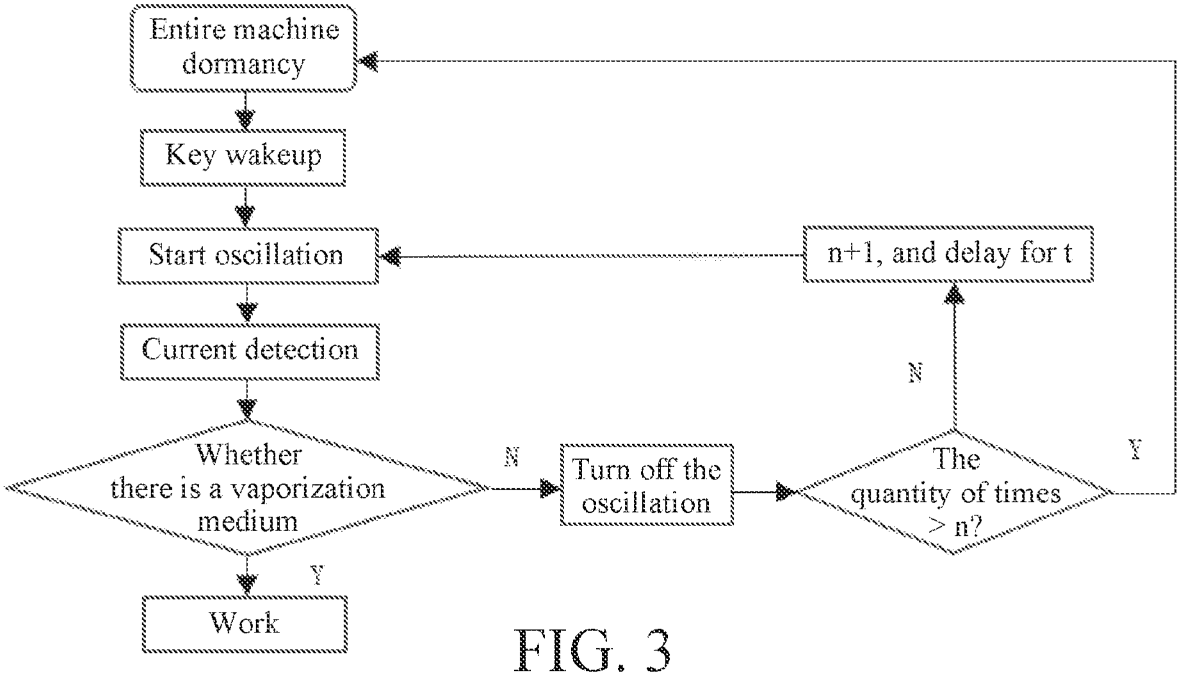
FIG. 3 is a schematic control flowchart of an electromagnetic heating device with a key according to an embodiment.

Specifically, as shown in FIG. 3, for an electronic vaporization apparatus with a key, if a key wakeup instruction is received during entire machine dormancy, a control apparatus starts oscillation, and determines whether there is a vaporization medium according to current detection. If there is a vaporization medium, the electronic vaporization apparatus continues working. If there is no vaporization medium, the control apparatus turns off the oscillation and determines whether a quantity of times of turning off the electromagnetic oscillation is greater than a preset quantity of times n. If the quantity of times of turning off the electromagnetic oscillation is greater than the preset quantity of times n, the electronic vaporization apparatus enters entire machine dormancy again. If the quantity of times of turning off the electromagnetic oscillation is not greater than the preset quantity of times n, the control apparatus records the quantity of times of turning off the electromagnetic oscillation increasing by 1, and starts the oscillation again after delaying for a preset duration t.

Figure 4:
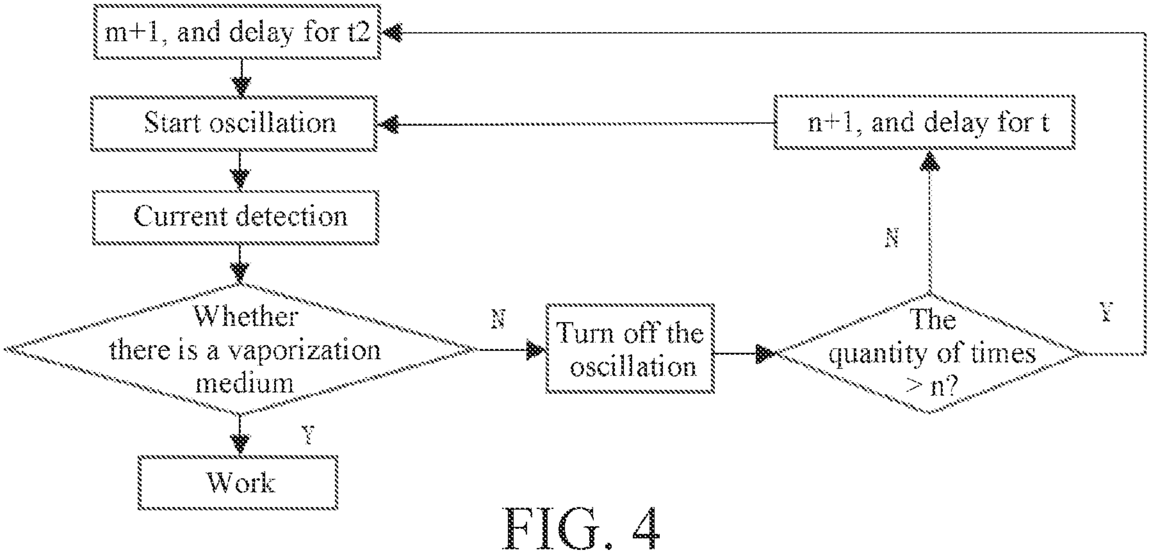
FIG. 4 is a schematic control flowchart of an electromagnetic heating device without a key according to an embodiment.

As shown in FIG. 4, for an electronic vaporization apparatus without a key, a control apparatus starts oscillation after previously stopping working and delaying for a set duration t2, and determines whether there is a vaporization medium according to current detection. If there is a vaporization medium, the electronic vaporization apparatus continues working. If there is no vaporization medium, the control apparatus turns off the oscillation and determines whether a quantity of times of turning off the electromagnetic oscillation is greater than a preset quantity of times n. If the quantity of times of turning off the electromagnetic oscillation is greater than the preset quantity of times n, the electronic vaporization apparatus stops working, records a quantity of times of working m increasing by 1, and starts next time of working and starts the oscillation again after delaying for the set duration t2. If the quantity of times of turning off the electromagnetic oscillation is not greater than the preset quantity of times n, the control apparatus records the quantity of times of turning off the electromagnetic oscillation increasing by 1, and starts the oscillation again after delaying for a preset duration t1.

Direct currents obtained by current sampling have different performances according to alloys (or metals) made of different materials used by devices configured to heat a vaporization medium. When a device including an alloy or a metal made of a class 1 material is used to heat the vaporization medium, a direct current at a current sampling end is less than a current in a no-load state. When a device including an alloy or a metal made of a class 2 material is used to heat the vaporization medium, a direct current at a current sampling end is greater than the current in the no-load state. Based on this, in definition of product design, one material may be set as a standard material for heating a vaporization medium. Power output can be stopped when it is determined that there is no vaporization medium, thereby saving energy, reducing consumption, and improving the service life of a device.

Assuming that one material in class 1 materials is set as the standard material, a determining threshold may be set to be less than a direct current in a no-load state (for example, 80% of the direct current). Through analog-to-digital sampling of the direct current and setting of threshold determining, if a detected current value is less than the determining threshold, it is determined that there is a vaporization medium; otherwise, there is no vaporization medium. In addition, to avoid mixing of a material in class 2 materials, if a heating current is less than the determining threshold corresponding to the standard material and a current heating curve does not meet set curve data within an accumulated period of time (10 s to 30 s) during a heating process, it is determined that there is no vaporization medium.

Assuming that one material in the class 2 materials is set as the standard material, a determining threshold may be set to be greater than a direct current in a no-load state (for example, 120% of the direct current). Through analog-to-digital sampling of the direct current and setting of threshold determining, if a detected current value is greater than the determining threshold, it is determined that there is a vaporization medium; otherwise, there is no vaporization medium. In addition, to ensure safe and stable running of the circuit, when a current is greater than a specific value, overcurrent protection is performed.

The above control method can ensure that an electromagnetic heating material can be accurately determined, and can also accurately determine whether a medium placed in a device can well work, thereby ensuring the matching performance and heating rate between the medium and the device; and avoids system instability or waste of electrical energy caused by no medium, thereby improving system reliability and system working efficiency, improving the service life of the device, reducing the loss of electric energy, and improving the customer experience. Based on the same inventive concept, an embodiment of this application further provides an apparatus for controlling an electromagnetic heating device configured to implement the above method for controlling an electromagnetic heating device. The solution to the problem provided by the apparatus is similar to the solution described in the above method. Therefore, for specific limitations in one or more embodiments of the apparatus for controlling an electromagnetic heating device provided below, reference may be made to the limitations on the above method for controlling an electromagnetic heating device. Details are not repeated herein again.

Figure 5:
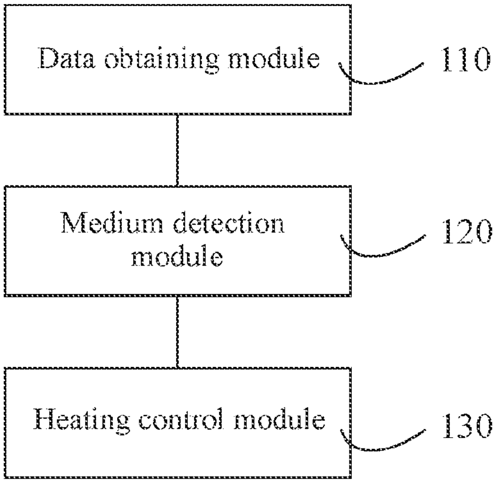
FIG. 5 is a structural block diagram of an apparatus for controlling an electromagnetic heating device according to an embodiment.

In an embodiment, an apparatus for controlling an electromagnetic heating device is provided, where the electromagnetic heating device may be a device using electromagnetic heating such as an electronic vaporization apparatus or a heating appliance. As shown in FIG. 5, the apparatus includes: a data obtaining module 110, a medium detection module 120, and a heating control module 130.

The data obtaining module 110 is configured to obtain a sampling current obtained by a current sampling apparatus detecting a main loop in which an electromagnetic oscillation and power output circuit of an electromagnetic heating device is located.

The medium detection module 120 is configured to detect, according to the sampling current and preset determining data, whether the electromagnetic heating device accommodates a medium.

The heating control module 130 is configured to control, in a case that the electromagnetic heating device does not accommodate a medium, the electromagnetic oscillation and power output circuit to stop electromagnetic oscillation.

In an embodiment, the determining data includes a determining threshold, and the medium detection module 120 further determines the determining threshold according to a type of material used for heating a medium.

In an embodiment, the medium detection module 120 sets, in a case that the material used for heating the medium is a first-type material, the determining threshold to be less than a direct current in a no-load state of the electromagnetic heating device, where in a case that the electromagnetic heating device accommodates a medium heated using the first-type material, a direct current of the main loop is less than the direct current in the no-load state of the electromagnetic heating device.

In an embodiment, the medium detection module 120 determines, if the sampling current is less than the determining threshold, that the electromagnetic heating device accommodates a medium.

In an embodiment, the medium detection module 120 sets, in a case that the material used for heating the medium is a second-type material, the determining threshold to be greater than a direct current in a no-load state of the electromagnetic heating device, where in a case that the electromagnetic heating device accommodates a medium heated using the second-type material, a direct current of the main loop is greater than the direct current in the no-load state of the electromagnetic heating device.

In an embodiment, the medium detection module 120 determines, if the sampling current is greater than the determining threshold, that the electromagnetic heating device accommodates a medium.

In an embodiment, the heating control module 130 controls, after a key wakeup instruction is received or electromagnetic oscillation is turned off for a set duration, the electromagnetic oscillation and power output circuit to start electromagnetic oscillation.

In an embodiment, the heating control module 130 controls, after delaying for a preset duration, the electromagnetic oscillation and power output circuit to start electromagnetic oscillation again, until a quantity of times of turning off the electromagnetic oscillation reaches a preset quantity of times.

For a specific limitation on the apparatus for controlling an electromagnetic heating device, reference may be made to the limitation on the above method for controlling an electromagnetic heating device. Details are not described herein again. The modules in the apparatus for controlling an electromagnetic heating device may be implemented entirely or partially by software, hardware, or combinations thereof. The foregoing modules may be built in or independent of a processor of a computer device in a hardware form, or may be stored in a memory of the computer device in a software form, so that the processor invokes and performs an operation corresponding to each of the foregoing modules.

Figure 6:
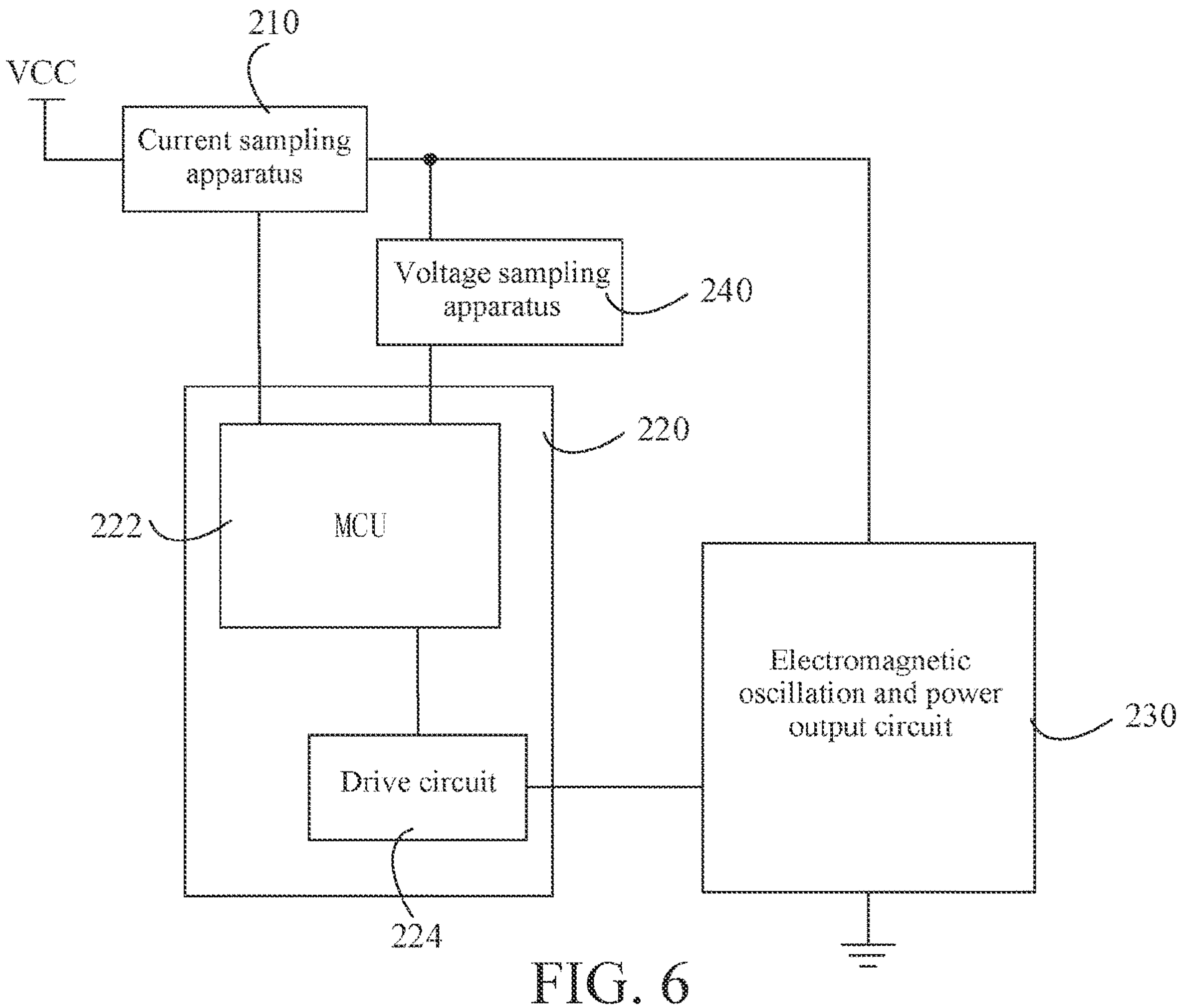
FIG. 6 is a structural block diagram of an electromagnetic heating device according to an embodiment.

In an embodiment, an electromagnetic heating device is further provided. As shown in FIG. 6, the electromagnetic heating device includes a current sampling apparatus 210, a control apparatus 220, and an electromagnetic oscillation and power output circuit 230, the current sampling apparatus 210 is connected to a main loop in which the electromagnetic oscillation and power output circuit 230 is located, the control apparatus 220 is connected to the current sampling apparatus 210 and the electromagnetic oscillation and power output circuit 230, the current sampling apparatus 210 is configured to detect the main loop in which the electromagnetic oscillation and power output circuit 230 is located to obtain a sampling current, and send the sampling current to the control apparatus 220, and the control apparatus 220 is configured to perform electromagnetic heating control according to the above method.

The control apparatus 220 includes a controller 222 and a drive circuit 224. The controller 222 is connected to the current sampling apparatus 210 and the drive circuit 224. The drive circuit 224 is connected to the electromagnetic oscillation and power output circuit 230. By using an example in which the drive circuit 224 specifically uses an MCU, the current sampling apparatus 210 obtains a current signal from the main loop and amplifies and outputs the current signal to the MCU. When oscillation needs to be started, the MCU controls the drive circuit 224 to output a PWM wave with a fixed frequency to the electromagnetic oscillation and power output circuit 230. The electromagnetic oscillation and power output circuit 230 includes an oscillation circuit and a switch control circuit. After a vaporization medium equipped with a metal heating device (for example, a metal sheet) is placed in an electromagnetic coil of the oscillation circuit, high-frequency oscillation generated by the circuit is induced to a metal sheet through the electromagnetic coil to realize electromagnetic heating, so as to realize power output. In addition, the electromagnetic heating device may further include a voltage sampling apparatus 240 connected to the control apparatus 220. The voltage sampling apparatus 240 detects a voltage of the main loop, and sends the voltage to the MCU. The MCU may further adjust the PWM wave outputted by the drive circuit 224 with reference to the sampling voltage.

In the above electromagnetic heating device, after a current sampling apparatus 210 detects a main loop in which an electromagnetic oscillation and power output circuit of an electromagnetic heating device is located to obtain a sampling current, the control apparatus 220 detects whether the electromagnetic heating device accommodates a medium with reference to the sampling current and preset determining data, and controls the electromagnetic oscillation and power output circuit 230 stop electromagnetic oscillation in a case that the electromagnetic heating device does not accommodate a medium. In this way, waste of electric energy or a device failure caused by the electromagnetic heating device working in a state without accommodating a medium is avoided, thereby improving the service life of the device, reducing the loss of electric energy, and improving the usage convenience of the electromagnetic heating device.

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described in this specification.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for controlling an electromagnetic heating device, comprising:

obtaining a sampling current obtained by a current sampling apparatus detecting a main loop in which an electromagnetic oscillation and power output circuit of an electromagnetic heating device is located;

detecting, according to the sampling current and preset determining data, whether the electromagnetic heating device accommodates a medium; and controlling, if the electromagnetic heating device does not accommodate a medium, the electromagnetic oscillation and power output circuit to stop electromagnetic oscillation, wherein the preset determining data comprises a determining threshold, and wherein, before the detecting, according to the sampling current and preset determining data. whether the electromagnetic heating device accommodates the medium, the method further comprises:

determining the determining threshold according to a type of material used for heating the medium, wherein determining the determining threshold according to the type of material used for heating the medium comprises:

setting, if the material used for heating the medium is a first-type material, the determining threshold to be a direct current less than a current of the electromagnetic heating device in a no-load state, wherein, if the electromagnetic heating device accommodates the medium heated using the first-type material, a direct current of the main loop is less than the direct current in the no-load state of the electromagnetic heating device.

2. The method for controlling an electromagnetic heating device of claim 1, wherein the detecting, according to the sampling current and preset determining data, whether the electromagnetic heating device accommodates the medium comprises:

if the sampling current is less than the determining threshold, the electromagnetic heating device accommodates the medium.

3. The method for controlling an electromagnetic heating device of claim 1, wherein the determining the determining threshold according to the type of material used for heating the medium further comprises:

setting, if the material used for heating the medium is a second-type material, the determining threshold to be a direct current greater than a current of the electromagnetic heating device in a no-load state, wherein, if the electromagnetic heating device accommodates the medium heated using the second-type material, a direct current of the main loop is greater than the direct current in the no-load state of the electromagnetic heating device.

4. The method for controlling an electromagnetic heating device of claim 3, wherein the detecting, according to the sampling current and preset determining data, whether the electromagnetic heating device accommodates the medium further comprises:

if the sampling current is greater than the determining threshold, the electromagnetic heating device accommodates the medium.

5. The method for controlling an electromagnetic heating device of claim 1, wherein, before the obtaining the sampling current obtained by the current sampling apparatus detecting the main loop in which the electromagnetic oscillation and power output circuit of the electromagnetic heating device is located, the method further comprises:

controlling, after a key wakeup instruction is received or electromagnetic oscillation is turned off for a set duration, the electromagnetic oscillation and power output circuit to start the electromagnetic oscillation.

6. The method for controlling an electromagnetic heating device of claim 5, wherein, after the controlling, if the electromagnetic heating device does not accommodate the medium, the electromagnetic oscillation and power output circuit to stop electromagnetic oscillation, the method further comprises:

returning, after delaying for a preset duration, to controlling the electromagnetic oscillation and power output circuit to start electromagnetic oscillation, until a quantity of times of turning off the electromagnetic oscillation reaches a preset quantity of times.

7. An apparatus for controlling an electromagnetic heating device, comprising:

a data obtaining module configured to obtain a sampling current obtained by a current sampling apparatus detecting a main loop in which an electromagnetic oscillation and power output circuit of an electromagnetic heating device is located;

a medium detection module configured to detect, according to the sampling current and preset determining data, whether the electromagnetic heating device accommodates a medium; and a heating control module configured to control, if the electromagnetic heating device does not accommodate the medium, the electromagnetic oscillation and power output circuit to stop electromagnetic oscillation;

wherein the preset determining data comprises a determining threshold, wherein, before the detecting, according to the sampling current and preset determining data, whether the electromagnetic heating device accommodates the medium, the medium detection module is further configured to:

determine the determining threshold according to a type of material used for heating the medium, wherein determining the determining threshold according to the type of material used for heating the medium comprises:

setting, if the material used for heating the medium is a first-type material, the determining threshold to be a direct current less than a current of the electromagnetic heating device in a no-load state, wherein, if the electromagnetic heating device accommodates the medium heated using the first-type material, a direct current of the main loop is less than the direct current in the no-load state of the electromagnetic heating device.

8. An electromagnetic heating device, comprising:

a control apparatus;

a current sampling apparatus; and an electromagnetic oscillation and power output circuit, wherein the current sampling apparatus is connected to a main loop in which the electromagnetic oscillation and power output circuit is located, wherein the control apparatus is connected to the current sampling apparatus and the electromagnetic oscillation and power output circuit, wherein the current sampling apparatus is configured to detect the main loop in which the electromagnetic oscillation and power output circuit is located to obtain a sampling current, and send the sampling current to the control apparatus, and wherein the control apparatus is configured to perform electromagnetic heating control according to the method of claim 1.

9. The apparatus for controlling an electromagnetic heating device of claim 7, wherein the medium detection module is further configured to:

determine, if the sampling current is less than the determining threshold, that the electromagnetic heating device accommodates the medium.

10. The apparatus for controlling an electromagnetic heating device of claim 7, wherein the medium detection module is further configured to:

set, if the material used for heating the medium is a second-type material, the determining threshold to be a direct current greater than a current of the electromagnetic heating device in a no-load state, wherein, if the electromagnetic heating device accommodates the medium heated using the second-type material, a direct current of the main loop is greater than the direct current in the no-load state of the electromagnetic heating device.

11. The apparatus for controlling an electromagnetic heating device of claim 10, wherein the medium detection module is further configured to:

determine, if the sampling current is greater than the determining threshold, that the electromagnetic heating device accommodates the medium.

12. The apparatus for controlling an electromagnetic heating device of claim 7, wherein, before the obtaining the sampling current obtained by the current sampling apparatus detecting the main loop in which the electromagnetic oscillation and power output circuit of the electromagnetic heating device is located, the heating control module is further configured to:

control, after a key wakeup instruction is received or electromagnetic oscillation is turned off for a set duration, the electromagnetic oscillation and power output circuit to start the electromagnetic oscillation.

13. The apparatus for controlling an electromagnetic heating device of claim 12, wherein, after the controlling, if the electromagnetic heating device does not accommodate the medium, the electromagnetic oscillation and power output circuit to stop electromagnetic oscillation, the heating control module is further configured to:

return, after delaying for a preset duration, to controlling the electromagnetic oscillation and power output circuit to start electromagnetic oscillation, until a quantity of times of turning off the electromagnetic oscillation reaches a preset quantity of times.

* * * * *